United States Patent [19]

Böhringer et al.

[11] Patent Number: 4,702,680

[45] Date of Patent: Oct. 27, 1987

[54] FUEL INJECTION PUMP

[75] Inventors: Wilfried Böhringer, Stuttgart; Franz J. Eheim, deceased, late of Stuttgart, Fed. Rep. of Germany, by Helga R. Eheim, heir

[73] Assignee: Robert Bosch GmbH, Stuttgart, Fed. Rep. of Germany

[21] Appl. No.: 858,445

[22] Filed: May 1, 1986

[30] Foreign Application Priority Data

May 15, 1985 [DE] Fed. Rep. of Germany ....... 3517521

[51] Int. Cl.[4] ........................ F04B 7/04; F04B 39/10; F16J 10/00

[52] U.S. Cl. .................................... 417/490; 123/449; 417/499; 92/174

[58] Field of Search ....................... 417/490, 492, 500; 123/449, 447, 495; 92/171

[56] References Cited

U.S. PATENT DOCUMENTS

| | | | |
|---|---|---|---|
| 1,955,383 | 4/1934 | Hermann | 417/500 |
| 2,593,550 | 4/1952 | Fodor | 92/171 |
| 2,784,040 | 3/1957 | Head | 92/171 |
| 3,058,455 | 10/1962 | Hofer | 123/449 |
| 3,207,081 | 9/1965 | Bauer | 92/171 |
| 3,387,562 | 6/1968 | Voit | 417/500 |
| 3,446,427 | 5/1969 | Vereschagin | 92/171 |
| 4,458,648 | 7/1984 | Braun | 123/449 |

FOREIGN PATENT DOCUMENTS

| | | | |
|---|---|---|---|
| 2450521 | 5/1976 | Fed. Rep. of Germany . | |
| 819858 | 9/1959 | United Kingdom | 123/449 |

*Primary Examiner*—Carlton R. Croyle
*Assistant Examiner*—Jane E. Obee
*Attorney, Agent, or Firm*—Felfe & Lynch

[57] ABSTRACT

A fuel injection pump for internal combustion engines has at least one pump working chamber which is defined on one side by the end face of the pump piston and the wall of the cylinder, and on the other side by a screw closure, the screw closure comprising a stopper containing a plug. The stopper can be tightened onto the cylinder by a sealing sleeve, and the stopper preferably comprises an outer threaded ring and an internal threaded sleeve soldered into the latter.

5 Claims, 2 Drawing Figures

FUEL INJECTION PUMP

This invention relates to a fuel injection pump for internal combustion engines. In a known fuel injection pump (DE-OS No. 24 50 521) a discharge valve is disposed on the same axis with the pump piston above the pump working space, and its closing spring is disposed within a pot-like sealing sleeve which is held tightly on a valve holder by a cap serving as a screw closure, so that a seal is formed. This known fuel injection pump has a disproportionately large dead space, the pump working space itself being ventable only by loosening the cap or through one of the discharge lines leading to the engine cylinders. A fuel injection pump, as is known, must be vented upon first start-up, or also whenever the fuel tank has been pumped empty. A large dead space is disadvantageous chiefly because, at the high injection pressures, the fuel is compressed, since it is compressible, and errors in the control of the rate of flow are produced according to the dead space. Furthermore, dead space can lead to the formation of voids during the suction stroke, resulting in gas or air inclusions which present the danger of cavitation and/or errors at the beginning of injection.

SUMMARY OF THE INVENTION

The fuel injection pump according to the invention, has the advantage that the sealing sleeve is gripped sealingly between the plug and the part receiving the pump piston, while the central opening of the stopper is filled up by the venting plug such that no dead space is present. In contrast to the above-described known fuel injection pump, a plurality of discharge valves is provided, which in the pump according to the ivention, after the distributing operation by the pump piston, are each disposed in front of the discharge lines. The venting of the pump working chamber can advantageously be performed in the pump according to the invention simply by unscrewing the venting plug, and when it is screwed back in again, the plug, which is advantageously pin-like, plunges directly into the fuel that is in the central plug opening after venting.

According to a preferred embodiment of the invention, the stopper has two parts, comprising an outer threaded ring and a threaded sleeve which accommodates the venting plug and preferably is soldered coaxially into the stepped internal bore of the threaded ring, the sealing sleeve abutting against the axial annular surface formed by the step. This design has advantages as regards production, since the two-part construction makes it possible to produce a good finish on the axial annular surface, which also serves for sealing, before the threaded sleeve is soldered in place. In this manner the end face of the sealing sleeve abuts against a well-finished bearing surface, as is preferable for the high-pressure seal.

In order on the other hand to have a sufficient number of threads available for the venting plug, the distance from the pump piston to the internal thread of the threaded sleeve is made shorter than the distance from the pump piston to the annular surface. The contact surface serving for the soldering between the outer threaded ring and the threaded sleeve can be relatively small to achieve adequate strength and tightness. Advantageously, the outwardly facing end face of the threaded sleeve can serve as an axial sealing surface for an annular gasket compressed by the head of the venting plug. Here, too, this sealing surface can be machined prior to the soldering together of the two parts.

According to a preferred embodiment of the invention, the bore receiving the pump piston is disposed in a cylinder, while the sealing sleeve is tightened against the confronting end face of the cylinder by the stopper. In this manner the sealing sleeve advantageously is part of the defining wall of the pump working chamber, with the advantage of eliminating the need for additional seals.

Also, according to a preferred embodiment of the invention, the ends of the sealing sleeve preferably have at least one chamfer forming a knife-edge, in order thereby to achieve maximum Hertzian pressures at the seals and thus a better seal. This seal can be improved by the selection of different materials and/or different annealing.

In accordance with the invention, therefore, a fuel injection pump for internal combustion engines comprises a pump piston having an end face defining one surface of a working chamber. The pump also includes a piston-guiding member including a bore receiving the pump piston and having an inside wall defining another surface of the working chamber. The pump also includes a pump casing having a threaded bore and a sealing sleeve having an end face. The pump also includes a screw cap which can be threaded into the threaded bore of the pump casing and which seals the working chamber from the exterior and accommodates the sealing sleeve. The screw cap comprises a stopper having an external thread for screwing into the threaded bore. The stopper has an internal threaded bore and the screw cap comprises a venting plug which can be screwed coaxially into the internal bore of the stopper. The sealing sleeve is tightened at the end face by the screw cap onto the piston-guiding member in order to seal the working chamber.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

DESCRIPTION OF THE PREFERRED EMBODIMENT

Figure 1:
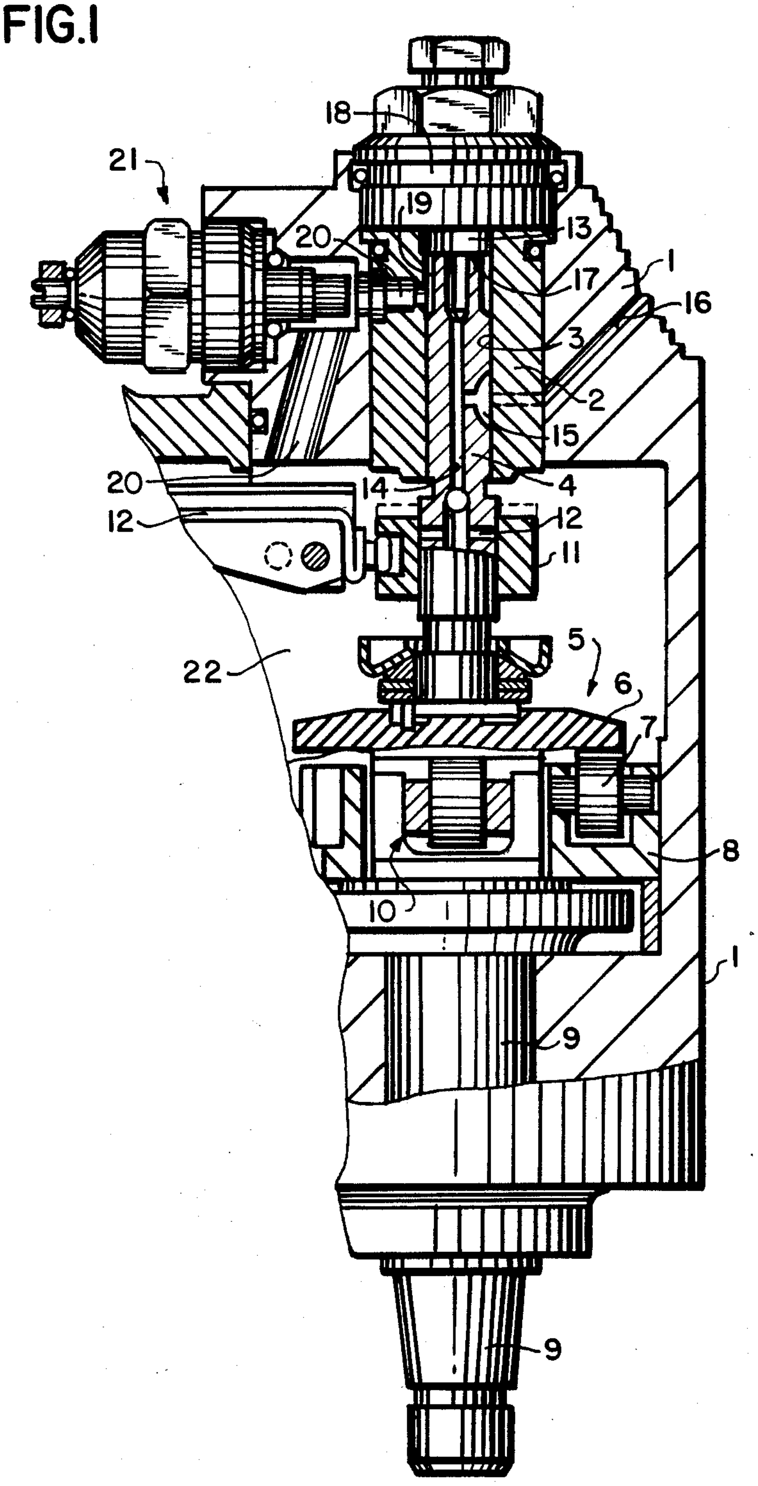
FIG. 1 is a partial longitudinal sectional view through a distributing injection pump constructed in accordance with the invention.

In a casing 1 of a distributing injection pump there is disposed a cylinder 2 in whose internal bore 3 a pumping and distributing piston 4 operates.

The pumping and distributing piston 4 is set in reciprocating and simultaneous rotational movement by a cam drive 5; a cam 6 which runs on rollers 7 of a roller ring 8 and is joined co-rotationally with the pump piston serves for this purpose. The rotational movement is produced by a drive shaft 9, likewise journaled in the pump casing 1, which is coupled by a jaw clutch 10 to the pumping and distributing piston 4.

A control valve 11 is disposed for axial displacement on the shaft of the pumping and distributing piston 4, and its axial position is determined by a control lever **12*a* of a speed regulator not otherwise indicated. By the control valve 11, an unloading passage 12 of a pumping work chamber 13 is opened sooner or later according to the axial position of the control valve 11, so that each time the amount of fuel is injected which is delivered until the unloading passage 12 is opened, which depends on the axial position of the control valve 11. A distribution bore 15 branches off from a central bore 14 in the pump piston, from which the unloading passage 12 also branches off. During one rotation of the pumping and distributing piston 4, this distribution bore 15 is connected successively with discharge lines 16 running in the cylinder 2 and in the casing 1, the number of which corresponds to the number of cylinders of the internal combustion engine. Discharge valves, which are not shown, are disposed in these discharge lines 16**.

Figure 2:
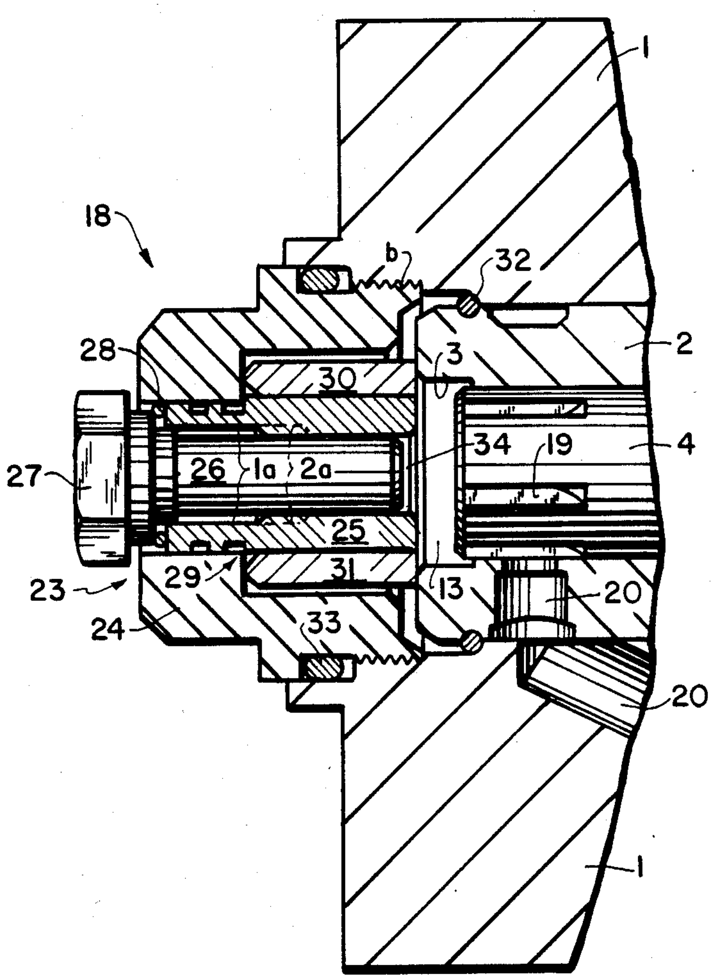
FIG. 2 is a fragmentary sectional view, to an enlarged scale, of the FIG. 1 pump.

The pump working chamber 13 is defined by the face 17 of the pumping and distributing piston 4, by the wall of the bore 3 of the cylinder 2, and by a screw stopper 18, which is represented on a larger scale in FIG. 2. The pump working chamber 13 is in communication at the face 17 through longitudinal grooves 19 whose number corresponds to the number of the discharge lines 16, and which control a suction passage 20 running in the cylinder 2 and in the casing 1. The suction passage 20 is additionally controlled by a solenoid valve 21.

The injection pump represented in the drawings operates as follows: During the suction stroke of the pumping and distributing piston 4, produced by the cam drive 5, fuel is pumped through the suction passage 20 from the inner chamber of the casing serving as the suction chamber 22, through each longitudinal groove 19, into the pump working chamber 13. The suction chamber 22 is, for this purpose, under a slight pressure. Then, as soon as the movement of the pumping and distributing piston 4 is reversed, fuel is pumped from the pump working chamber 13 through the central bore 14 to the distribution bore 15, and from there through one of the discharge passages 16 to the internal combustion engine. As soon as a certain length of the piston stroke has been covered and the relief passage 12 has been opened by the control valve 11, this pumping of fuel to the internal combustion engine, which takes place under high pressure, is interrupted as the fuel that is still in the pump working chamber 13 flows back under low pressure into the suction chamber 22. The pump can be shut off by closing the suction passage 20 by means of the solenoid valve 21. The amount pumped to the internal combustion engine is varied by the rotational speed control by shifting the control valve 11.

The screw cap 18 preferably comprises, as can be seen in FIG. 2, a stopper 23 comprising two parts, namely an outer threaded ring 24 and a threaded sleeve 25 soldered in the latter. As indicated by threads $a_1$, $a_2$ of FIG. 2, a venting plug 26 is screwed into the threaded sleeve 25, preferably occupying virtually the entire internal bore of the threaded sleeve 25, and, with its head 27, pressing an annular gasket 28, for example, of rubber, against the outwardly facing end of the threaded sleeve 25. The threaded sleeve 25 has a shoulder 29 with which it abuts against a shoulder 30 of the internal bore of the ring 24. This annular surface 30 serves simultaneously as an abutment for a sealing sleeve 31 which at the other end abuts against the cylinder 2. The cylinder 2 in turn is secured against axial displacement by a ring 32 abutting against the casing 1. Further, a gasket 33 is disposed between the externally threaded ring 24 and the casing 1 above threads b.

The pump working chamber is sealed metallically from the exterior by this screw closure 18 by the fact that the sealing sleeve 31 adjoins the cylinder 2 and inwardly it adjoins the soldered-in threaded sleeve 25. The venting plug 26 also defines at its bottom face 34 the pump working chamber 13. In order to achieve high Hertzian pressures against the end sealing surfaces of the sealing sleeve 31, each of these end faces is chamfered to form a knife-edge.

For the venting of the pump working chamber 13, the venting plug 26 is unscrewed out of the threaded sleeve 25, so that the space that is released can be filled up with fuel. Then the pin-like plug 26 is immersed into this fuel and threaded into the threaded sleeve 25, so that no air or gases remain in the pump working chamber 13. In order to achieve a sufficient thread overlap between the plug 26 and the thread of the threaded sleeve 25, and, on the other hand, to make the sealing sleeve 31 long enough to achieve a sufficient elastic deformability, the thread overlap $a_1$ is longer than the partially soldered contact section between externally threaded ring 24 and threaded sleeve 25.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A fuel injection pump for internal combustion engines, comprising:

a pump piston having an end face defining one surface of a working chamber;

a piston-guiding member including a bore receiving said pump piston and having an inside wall defining another surface of said working chamber;

a pump casing having a threaded bore;

a sealing sleeve having an end face;

a screw cap which can be threaded into said threaded bore of said pump casing and which seals said working chamber from the exterior and accommodates said sealing sleeve;

said screw cap comprising a stopper having an external thread for screwing into said thereaded bore;

said stopper having an internal threaded bore;

said screw cap further comprising a venting plug which can be screwed coaxially into said internal bore of said stopper;

sealing sleeve being tightened at said end face by said screw cap onto said piston-guiding member in order to seal said working chamber;

said stopper comprising an externally threaded ring having a stepped internal bore forming an axial annular surface;

a threaded sleeve disposed coaxially in said stepped internal bore and having an internal thread, said threaded sleeve accommodating said venting plug; and said sealing sleeve abutting against said axial annular surface formed by said step.

2. A fuel injection pump according to claim 1, in which the distance from said piston-guiding member to said internal thread of said threaded sleeve is less than the distance from said piston-guiding member to said annular surface of said externally threaded ring.

3. A fuel injection pump according to claim 1, which includes an annular gasket and in which said venting plug has a head and in which said threaded sleeve has an outwardly facing end face serving as an axial abutment for said annular gasket clamped by said head of said venting plug.

4. A fuel injection pump according to claim 1, in which said piston-guiding member comprises a cylinder including said bore receiving said pump piston and a cylinder end face and in which said sealing sleeve is clamped onto said cylinder end face by said stopper.

5. A fuel injection pump according to claim 1, in which said sealing sleeve has at least one end face having at least one chamfer forming a knife-edge.

* * * * *